(12) United States Patent
Veloso et al.

(10) Patent No.: US 10,459,504 B2
(45) Date of Patent: Oct. 29, 2019

(54) TELEMATICS SERVICE BUTTONS INTEGRATED WITH INFOTAINMENT SYSTEM USING AN UNINTERRUPTED POWER SUPPLY WITH OPTMIZED CONSUMPTION

(71) Applicant: GM GLOBAL TECHNOLOGY OPERATIONS LLC, Detroit, MI (US)

(72) Inventors: Alex José Veloso, São Caetano do Sul (BR); Leandro Zavarez Barbosa, Vila Firmiano Pinto (BR)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 739 days.

(21) Appl. No.: 15/084,045

(22) Filed: Mar. 29, 2016

(65) Prior Publication Data

US 2017/0285712 A1 Oct. 5, 2017

(51) Int. Cl.
*G06F 1/30* (2006.01)
*G06F 1/26* (2006.01)
(Continued)

(52) U.S. Cl.
CPC .............. *G06F 1/30* (2013.01); *G06F 1/263* (2013.01); *G06F 1/3234* (2013.01);
(Continued)

(58) Field of Classification Search
CPC ....... H04L 67/12; H04L 69/40; B60R 25/403; G06F 1/263; G06F 1/30; G06F 1/3234; G06F 3/0482; G06F 3/04842; G06F 3/04883; G06F 3/04886; G06F 3/16; G06F 3/0412; G06F 3/0416; H04W 52/0261; H04W 52/0296; B60W 2050/021; B60W 2050/0292; B60W 2050/0297; H04M 1/72536; H04M 3/5116; B60L 2250/16; B61L 27/0066
See application file for complete search history.

(56) References Cited

U.S. PATENT DOCUMENTS

9,182,903 B2 * 11/2015 Lombardi ............. G06F 1/3206
9,238,465 B1 * 1/2016 Ghannam ......... B60W 50/0205
(Continued)

*Primary Examiner* — Matthew Ell
*Assistant Examiner* — Maria S Ayad
(74) *Attorney, Agent, or Firm* — Lorenz & Kopf, LLP (57) ABSTRACT

An in-vehicle system is described that initiates a telematics service call via a touch-based user interface. The in-vehicle system includes a telematics unit that supports communications relating to telematics services, an infotainment center, and a touchscreen interface configured to present user-selectable controls for invoking services provided by the infotainment center and the telematics unit. The system further comprises a backup battery configured to supply power, during a disruption of power supply from a primary power supply, to: the touchscreen interface, the telematics unit, and a microphone/speaker providing bi-directional audio communications with providers of telematics services. The system furthermore includes a backup battery mode control configured to sense a disruption of power provided by the primary power supply. In response to the disruption, the mode control activates a low-power operating mode for the touchscreen interface.

18 Claims, 4 Drawing Sheets

(51) Int. Cl.
*G06F 1/3234* (2019.01)
*G06F 3/0482* (2013.01)
*G06F 3/0488* (2013.01)
*G06F 3/16* (2006.01)
*G06F 3/0484* (2013.01)
*H04L 29/08* (2006.01)

(52) U.S. Cl.
CPC .......... *G06F 1/3262* (2013.01); *G06F 1/3265* (2013.01); *G06F 3/0482* (2013.01); *G06F 3/0488* (2013.01); *G06F 3/04842* (2013.01); *G06F 3/04883* (2013.01); *G06F 3/04886* (2013.01); *G06F 3/16* (2013.01); *H04L 67/12* (2013.01)

(56) References Cited

U.S. PATENT DOCUMENTS

| | | | | |
|---|---|---|---|---|
| 2002/0091955 A1* | 7/2002 | Christopher | ......... | G06F 1/3203 713/323 |
| 2007/0288102 A1* | 12/2007 | Korzin | ...... | G06F 1/32 700/22 |
| 2010/0056195 A1* | 3/2010 | Nixon | ................. | G08G 1/0962 455/518 |
| 2011/0063276 A1* | 3/2011 | Tan | ........................ | G09G 3/342 345/212 |
| 2011/0279436 A1* | 11/2011 | Komiya | ............... | G09G 3/3233 345/212 |
| 2012/0287262 A1* | 11/2012 | Nakayama | ............. | B60K 35/00 348/113 |
| 2014/0278837 A1* | 9/2014 | Blumer | .................. | G07B 15/00 705/13 |
| 2015/0066366 A1* | 3/2015 | Pang | ...................... | G01C 21/32 701/532 |
| 2015/0094910 A1* | 4/2015 | Bassier | ................. | G06F 3/0416 701/41 |
| 2015/0293575 A1* | 10/2015 | Hampson | ............. | G06F 1/3212 713/323 |
| 2015/0350611 A1* | 12/2015 | Pearson | .................. | H04L 67/10 348/158 |
| 2016/0132132 A1* | 5/2016 | Li | ........................ | G06F 1/1694 715/702 |
| 2016/0157179 A1* | 6/2016 | Jung | ................. | H04W 52/0261 455/574 |

\* cited by examiner

TELEMATICS SERVICE BUTTONS INTEGRATED WITH INFOTAINMENT SYSTEM USING AN UNINTERRUPTED POWER SUPPLY WITH OPTMIZED CONSUMPTION

TECHNOLOGY FIELD

The present disclosure relates generally to motor vehicle-based telematics/infotainment systems and more specifically to using telematics systems within vehicles to establish a call directed to a supported telematics system service (e.g., navigation assistance, emergency service request, etc.).

BACKGROUND

Telematics units within mobile vehicles provide subscribers with connectivity to a telematics service provider (TSP). The TSP, in turn, provides connected subscribers with an array of services ranging from emergency call handling and stolen vehicle recovery to diagnostics monitoring and turn-by-turn navigation. Upon activation, the telematics unit provides a subscriber with a wide variety of telematics services rendered by a variety of networked providers.

Historically, communications connections for telematics services (providing navigation instructions, emergency service request assistance, etc.) are initiated by a user selecting an appropriate one of multiple physical hardware pushbuttons mounted in a vicinity of a vehicle rear-view mirror or overhead center console. Given the importance of remaining available after the vehicle is involved in an accident, a back-up power source (battery) is provided for the purpose of powering the telematics unit, including the hardware pushbuttons and associated telematics audio input/output equipment.

Providers of telematics systems face the challenge of ensuring continuous, easy, non-obtrusive user access to the aforementioned telematics service initiation pushbuttons.

SUMMARY OF THE INVENTION

As an alternative to dedicated hardware pushbuttons, a combined telematics/infotainment touchscreen interface presents a set of telematics services providers connection initiation buttons that are presented on any current telematics/infotainment touchscreen display. Moreover, a continuous (backup battery) power supply is maintained to ensure continued operation of at least the telematics services providers connection initiation buttons, and related communication hardware, when main power provided by a primary power source is disrupted, for example by battery disconnection or run down, to the telematics/infotainment touchscreen display device. In such case, a backup battery provides power to at least essential components of the telematics/infotainment system needed to present selectable interface controls, such as the telematics services providers connection initiation buttons, for initiating calls to emergency services. Such essential components include: audio input/output hardware (e.g., microphone, speaker), mobile wireless communications device, and at least a portion of a touchscreen display interface presenting user-selectable soft buttons, the soft buttons being selectable by a user to initiate an emergency service communication connection.

Thus, a system is described, for incorporating within a vehicle, that initiates a telematics service call via a touch-based user interface. The system comprises a telematics unit configured to support communications relating to telematics services, an infotainment center, a touchscreen interface configured to present user-selectable controls for invoking services provided by the infotainment center and the telematics unit. The system further comprises a backup battery configured to supply power, during a disruption of power supply from a primary power supply, to the touchscreen interface, the telematics unit, and a microphone/speaker providing bi-directional audio communications with providers of telematics services. The system furthermore includes a backup battery mode control configured to sense a disruption of power provided by the primary power supply. In response to the disruption, the mode control activates a low-power operating mode for the touchscreen interface.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Before discussing the details of the invention and the environment wherein the invention can be used, a brief overview of an exemplary networked telematics/infotainment system is given to guide the reader. In general terms, not intended to limit the claims, the invention/disclosure is directed to an alternative to dedicated hardware pushbuttons configured to, when pressed, request corresponding telematics-based services. In particular, a telematics/infotainment system touchscreen display interface presents a set of telematics service connection initiation buttons that are presented as a temporary overlay on any current telematics/infotainment services (e.g., audio content, navigation screen, turn-by-turn instructions, etc.) display.

Moreover, a continuous power supply is maintained, when main power provided by a primary power source is lost to the telematics/infotainment system touchscreen. In such case, a backup battery provides power to at least essential components of the processing and I/O interface components (including the telematics/infotainment system touchscreen) needed to present selectable emergency services. Such essential components include: audio input/output hardware (e.g., microphone, speaker) associated with emergency/roadside services, mobile wireless communications components, and at least a portion of the telematics/infotainment system touchscreen interface presenting user-selectable soft buttons, where at least one of the user-selectable soft buttons is selectable to invoke processes in the telematics unit to create an emergency service request communication connection.

Thus, the system described herein includes a touchscreen component configured to present a set of telematics service call soft buttons that are selectable by users to establish communications connections for requesting corresponding telematics services (e.g., navigation, emergency call, etc.) from a remote services provider. The system further comprises a backup battery and a corresponding power management control. The power management control selectively provides power to essential components while the backup battery is required to supply power for the telematics system. In a particular example, the power management control provides power to only a portion of a physical touchscreen I/O (display and touch sensing) interface including the user-selectable telematics service request soft buttons. The power management control disables a part of the touchscreen display that is not needed to present one or more of the set of telematics service call buttons (e.g., an emergency call button).

Moreover, the set of telematics service call buttons, while hidden from view in a default operational state of the touchscreen, are presented and "armed" for activation in response to a user touching a designated part of the touchscreen. Thus, while generally hidden, the set of telematics service call buttons are readily rendered (for selection) on the touchscreen by a simple user act of touching, for example, a designated "telematics services" button of a default operation screen of the touchscreen interface.

An exemplary computing and network communications environment is described hereinafter. It will be appreciated that the described environment is an illustrative example, and does not imply any limitation regarding the use of other environments to practice the described system and method for presenting telematics service request/launch buttons on a touchscreen interface of a vehicle to telematics/infotainment (referred to herein simply as "telematics") system.

Figure 1:
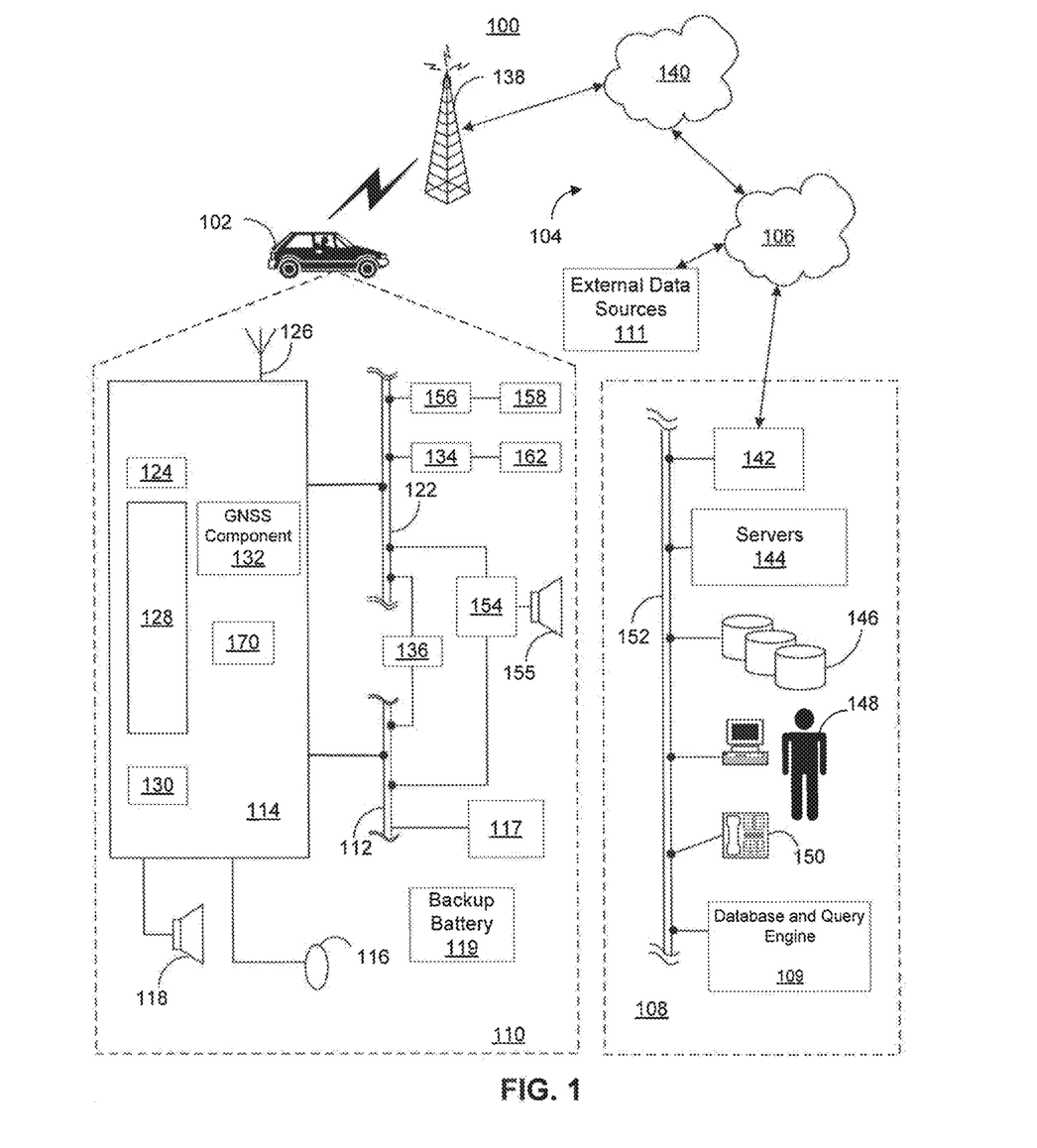
FIG. 1 is a schematic diagram of an operating environment for a mobile vehicle communication system usable in implementations of the described principles.

With reference to FIG. 1 there is shown an example of a communication system 100 that can be used with the present method and system to pass information pertinent to carrying out the described system and method. The communication system 100 generally includes a vehicle 102, a mobile wireless network system 104, a land network 106 and a communications center 108. It should be appreciated that the general overall architecture, setup and operation of the various networked components of the communication system 100 are generally known in the art and will not be described herein. Rather, the disclosure herein will primarily focus upon the re-configuration of the existing architecture of the communication system 100—in particular, in-vehicle 102 components of a telematics unit 114—to carry out the functionality of presenting selectable telematics service request buttons on a graphical display device 117 (hereinafter touchscreen 117) including touchscreen interface functionality described herein.

In accordance with an illustrative example, the communications center 108 includes a database and query engine 109. The database and query engine 109 incorporates functional components configured to manage a plurality of tables containing records including fields defining/describing vehicles, vehicle occupants (drivers/passengers), roads, etc.

The vehicle 102 is, for example, a motorcycle, a car, a truck, a recreational vehicle (RV), etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116 and a speaker 118 for carrying out a two-way (interactive) audio conversation with a communicatively connected telematics service provider, and the touchscreen 117. Notably absent are physical buttons typically found with known versions of the telematics unit 114.

In a warning mode of operation of the telematics unit 114, the speaker 118 is used, for example, to issue an audible warning/alert to a user when a notification is received from the communications center 108, via the communications system 100. Such use of a speaker to issue notifications can potentially reduce the need for a driver to view a display (e.g., touchscreen 117 coupled to an audio-video bus 112) to obtain warnings/alerts.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 is a highly configurable/programmable on-board electronic device providing a variety of services through execution of configured program instructions and communications with networked system components including, for example, the communications center 108. The telematics unit 114 includes an electronic processor 128, electronic memory 130, a mobile wireless component 124 including a mobile wireless chipset, a dual function antenna 126 (both GNSS and mobile wireless signal) that can be internal or external to telematics unit 114, and a GNSS component 132 including a GNSS chipset. In one example, the mobile wireless component 124 comprises an electronic memory storing a set of computer-executable instruction sets/routines that are transferred to, and executed by, the processing device 128. The mobile wireless component 124 constitutes a network access device (NAD) component of the telematics unit 114. The NAD operates to modulate one or more carrier wave signals to encode digital information for transmission via a mobile wireless network and demodulate signals received from the mobile wireless network to decode and render a digital version of the received information.

The telematics unit 114 provides, for users, an extensive/extensible set of services. Examples of such services include: concierge services; GNSS-based services including mapping/location identification, turn-by-turn directions, advanced warning for restricted areas and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle 102. The telematics unit 114 also supports receiving and forwarding a variety of sensor readings relating to operation of the vehicle 102.

The telematics unit 114 further includes a short-range wireless unit 170 capable of communicating with a user's mobile device such as a cellular phone, tablet computer, PDA, or the like, over a short-range wireless protocol. For example, in one implementation, the short-range wireless unit 170 is a Bluetooth unit with an RF transceiver that communicates with a vehicle occupant's mobile wireless communications device using Bluetooth protocol. It will be appreciated that other short-range wireless communication technologies other than Bluetooth are used in other implementations. The information provided by the mobile wireless device of a vehicle occupant, to the telematics unit 114, via the short-range wireless unit 170 is passed to, for example, the database and query engine 109 configured to maintain a searchable storehouse of information relating to registered occupant configuration information.

GNSS navigation services are, for example, implemented based on the geographic position information of the vehicle provided by the GNSS component 132. A user of the telematics unit 114 enters a destination, for example, using inputs associated with the GNSS component 132, and a route to a destination can be calculated based on the destination address and a current position of the vehicle determined at approximately the time of route calculation. Turn-by-turn (TBT) directions can be presented by the touchscreen 117 screen and/or through vocal directions provided through the speaker 118 or a speaker 155 driven by an audio component 154. It will be appreciated that the calculation-related processing can occur at the telematics unit 114 or can occur at the communications center 108.

The telematics unit 114 supports infotainment-related services whereby music, Web pages, movies, television programs, video games and/or other content is downloaded under control/command of an infotainment center 136 operatively connected to the telematics unit 114 via the vehicle bus 122 and the audio-video bus 112. In one example, downloaded content is stored for current or later playback on the memory 130.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

The telematics unit 114 uses radio transmissions to establish communications channels with the mobile wireless network system 104 so that voice and/or data signals can be sent and received via the communications channels. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component 132.

The microphone 116 provides the driver or other vehicle occupant with an interface for inputting verbal or other auditory commands to the telematics unit 114, and can be equipped with an embedded voice processing unit utilizing a human/machine interface (HMI) technology known in the art. The speaker 118 provides verbal output to the vehicle occupants and can be either a stand-alone speaker specifically dedicated for use with the telematics unit 114 or can be part of the audio component 154. In either case, the microphone 116 and the speaker 118 enable the hardware 110 and the communications center 108 to communicate with occupants of the vehicle 102 through audible speech.

Figure 2:
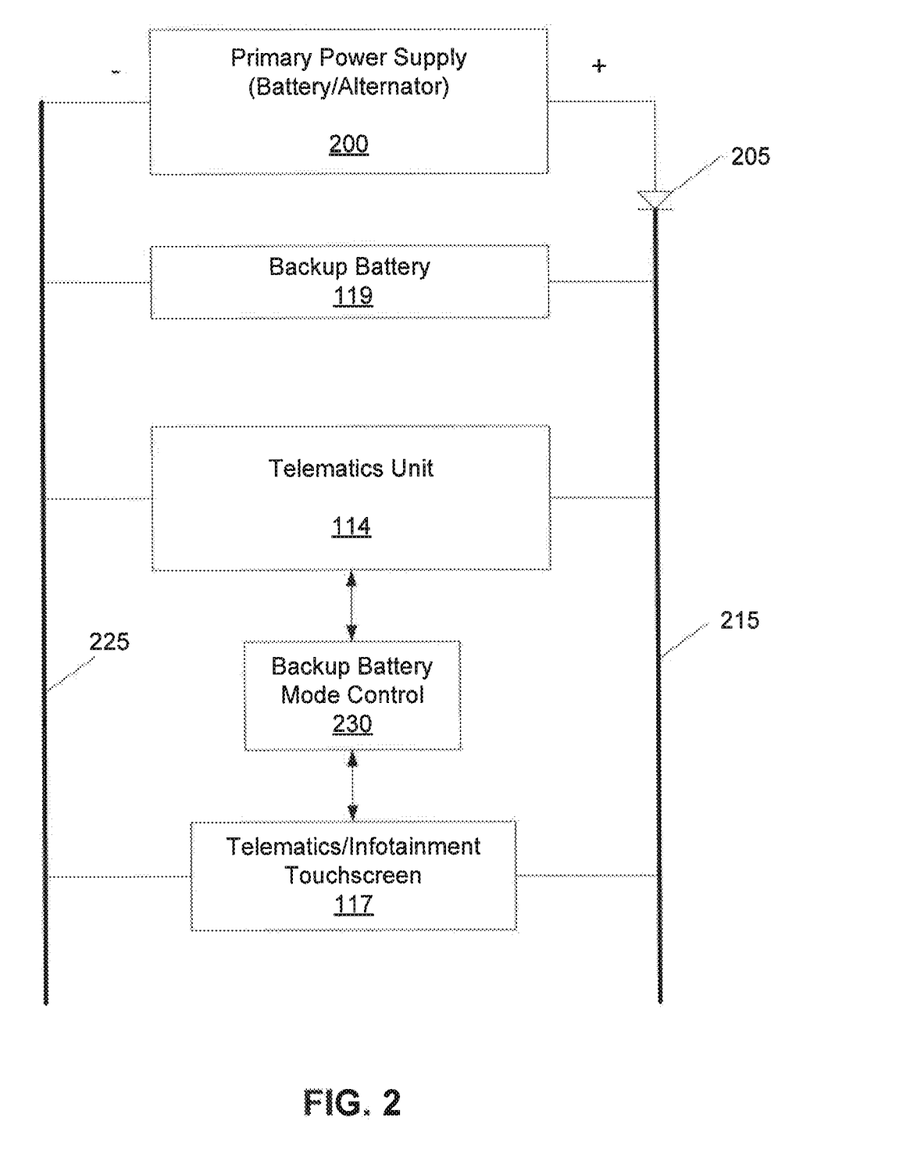
FIG. 2 is a schematic diagram depicting a set of components for an exemplary implementation of a redundant backup power supply scheme for carrying out implementations of the described telematics service request interface buttons using an telematics/infotainment touchscreen display interface.

The hardware 110 also includes a backup battery 119 that can be internal or external to the telematics unit 114 that provides temporary emergency power to critical components of the telematics unit 114 and related communication and I/O components necessary to provide telematics services in the event of main power (primary battery and/or alternator) loss. An exemplary arrangement of the connection of the backup battery 119 to the touchscreen 117 and telematics unit 114 is depicted in FIG. 2 described herein below.

The soft buttons enabling a vehicle occupant to request telematics services via the touchscreen 117 include, for example, a button to request a voice communication with the communications center 108 (Whether it be live advisors 148 or an automated call response system). In another example, one of the buttons initiates/activates emergency services supported/facilitated by the telematics unit 114. Yet another button requests navigation services.

The audio component 154 is operatively connected to the vehicle bus 122 and the audio-video bus 112. The audio component 154 receives analog information via the audio bus, and renders the received analog information as sound. The audio component 154 receives digital information via the vehicle bus 122. The audio component 154 provides AM/FM radio, and multimedia functionality (USB, SD Card, Bluetooth, CD, DVD, Blue Ray) independent of the infotainment center 136. The audio component 154 can contain the speaker system 155, or can utilize the speaker 118 via arbitration on the vehicle bus 122 and/or the audio-video bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

The set of vehicle sensors 162 are connected to corresponding ones of the set of sensor interface modules 134 operatively connected to the vehicle bus 122. In addition to the short-range wireless sensor specifically mentioned above, examples of the set of vehicle sensors 162 include gyroscopes, accelerometers, magnetometers, emission detection and/or control sensors, fuel level sensors, coolant temperature sensors, etc. Examples of the sensor interface modules 134 include ones for power train control, climate control, and body control. Data from the sensor interface modules 134 is provided to automobile electronic control units, including an engine control unit (ECU), body control module (BCM), electronic brake system module (EBCM), and other electronics vehicle module, not shown in FIG. 1.

The mobile wireless network system 104 is, for example, a cellular telephone network system or any other suitable mobile wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 and the land network 106.

As appreciated by those skilled in the art, the mobile wireless network system 104 includes various cell tower/base station/MSC arrangements. For example, a base station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records and other pertinent subscriber information. Although the illustrated example has been described as it would be used in conjunction with a maimed version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein can occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit can be carried out according to stored instructions or applications installed on the telematics unit, and operations performed at the call center can be carried out according to stored instructions or applications installed at the call center.

FIG. 2 provides an illustrative schematic diagram of an exemplary system power supply control architecture for carrying out backup battery supply functionality for continuous support of telematics service launch even when the telematics system 114 has lost access to a primary power supply (main battery, alternator, etc.). In the illustrative schematic diagram, a primary power supply 200 includes a primary battery and an alternator that operate as the primary power source for the electronic components of the vehicle 102 depicted in FIG. 1. A positive terminal of the primary power supply 200 is connected to a high capacity diode 205 (or other suitable power supply control circuit for ensuring that the primary supply does not draw power from the backup battery 119. The backup battery 119 is configured to acquire and maintain a charge until needed—i.e. in the event power supply from the primary power supply is disrupted. A power bus high voltage line 215 couples an output from the diode 205 to the backup battery 119, the telematics system 114 components and the telematics/infotainment touchscreen 117. A power bus low voltage line 225 couples the primary power supply 200 (low power terminal), the backup battery 119, the telematics system 114 components and the touchscreen 117 to a common low (ground) voltage.

The above-described power supply bus configuration is intended to be a representative configuration for providing primary and backup power to components of the telematics unit 114 and the touchscreen 117 connected to the telematics unit 114 through vehicle bus 122 or other direct hardware connection. Alternative primary/backup power supply circuits/schemes are contemplated in alternative configurations providing substantially similar functionality to the configuration schematically depicted in FIG. 2.

With continued reference to FIG. 2, a backup battery mode control 230, that can be external or internal to the telematics unit 114, is configured to sense a loss of power supplied by the primary power supply 200 by sensing a voltage differential across the positive/negative terminals of the primary power supply 200 and/or sensing flow of current from a positive terminal of the backup battery 119 connected to the power bus high voltage line 215. When the backup battery mode control 230 senses loss of power supplied by the primary power supply 200, a power conservation mode signal is issued by the backup battery mode control 230 to the telematics system 114 and/or the touchscreen 117 to cause an operation of the touchscreen 117 in a power saving mode wherein only a portion of a full touchscreen physical visual display (and sensor input) are active. The active portion of the touchscreen 117 display presents soft buttons corresponding to selectable telematics services for requesting one or more telematics services (e.g. emergency roadside service, call a live operator, etc.). Thus, the soft buttons utilized to request telematics services remain active/functional in the event of primary power supply loss.

The backup battery 119 should have sufficient energy/power capacity to power the telematics system 114 and touchscreen 117 in cases where the primary power supply is unavailable to power these components. The touchscreen 117 (of any type: LCD, AMOLED, OLED, etc.) supports a low power operation state. For example, the while operating in a low power consumption mode, the touchscreen 117 powers only a portion of a display interface that produces visible images of the telematics service call/initiation buttons. By way of example, the touchscreen 117 may incorporate an AMOLED (Active Matrix Organic Light Emitting Diode) display technology that uses a matrix of individually-switched self-illuminating diodes that can be controlled to emit light without the use of a master backlight that would be needed in the case of traditional LCD displays. Thus, only the pixels, formed by triads (group of LEDs to compose the colors), required to form the telematics service call initiation button images are energized. The rest of the display interface remains unpowered.

The touchscreen 117 alternatively incorporates traditional LCD (liquid crystal display) technology. However, since LCD displays require backlighting to produce a visible image over a specified area, relatively more power is needed for the touchscreen 117 using this technology. A power savings may be achieved by using multiple backlights assigned to dedicated portions of the touchscreen 117's display and selectively energizing only the backlight(s) needed to display the telematics service call buttons. In any event, in the case where LCD technology is used for the touchscreen 117, the backup battery 119 may need to have larger energy capacity in comparison to the case where AMOLED technology is used.

Figure 3A:
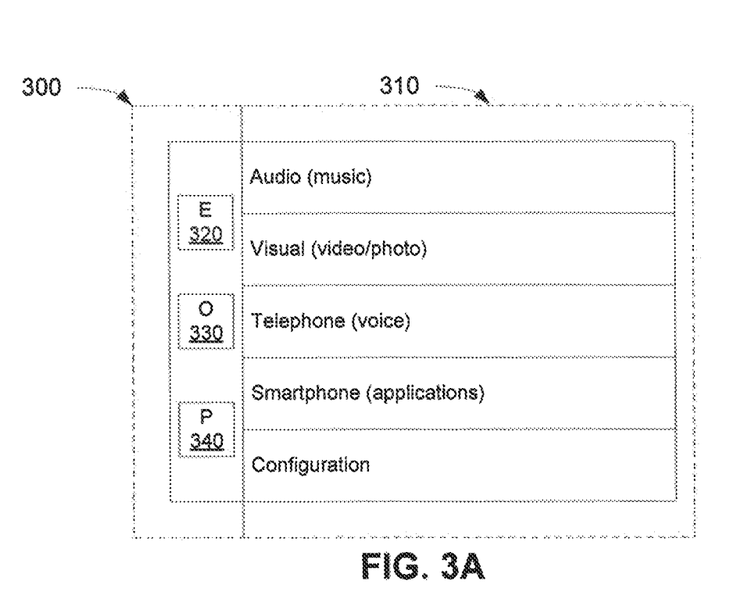
FIGS. 3A-3D depict a set of touchscreen display interfaces in various modes of operation and identifying particular segments of the display screen.

Turning to FIG. 3A, an exemplary home (top level) screen display interface of the touchscreen 117 is depicted. In the exemplary embodiment, a telematics display segment 300 includes a set of three soft buttons 320, 330 and 340 through which a user initiates a request for a particular telematics service. An emergency button 320, when selected, initiates an emergency call. A call center button 330 initiates a request for a telematics service call center advisor. A phone button 340 initiates a hands-free mobile wireless call functionality. An infotainment display segment 310 contains a set of user options that, when selected, launch an application/function-specific child display screen. It is emphasized that the particular configuration and shapes of the soft buttons for invoking services is merely exemplary in nature as other configurations are contemplated for alternative arrangements for soft buttons used to invoke services associated with the telematics display segment 300. This general applicability of various configurations is applicable to each of the exemplary interfaces described herein.

Figure 3B:
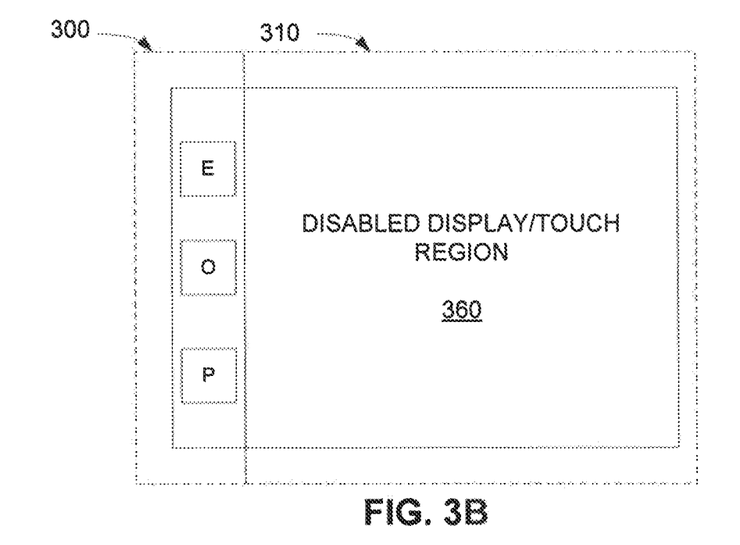

Turning to FIG. 3B, an exemplary, but expressly not limited to, power conservation mode of operation (corresponding to a backup battery power supply mode of operation of the telematics unit 114) of the touchscreen 117 is depicted. In this case, the telematics display segment 300 remains fully functional. However, the infotainment display segment 310 is disabled with regard to both display and touch sensitivity functionality to minimize power consumption while the telematics unit 114 operates according to a power conservation mode (when operating on backup battery 119 power).

Figure 3C:
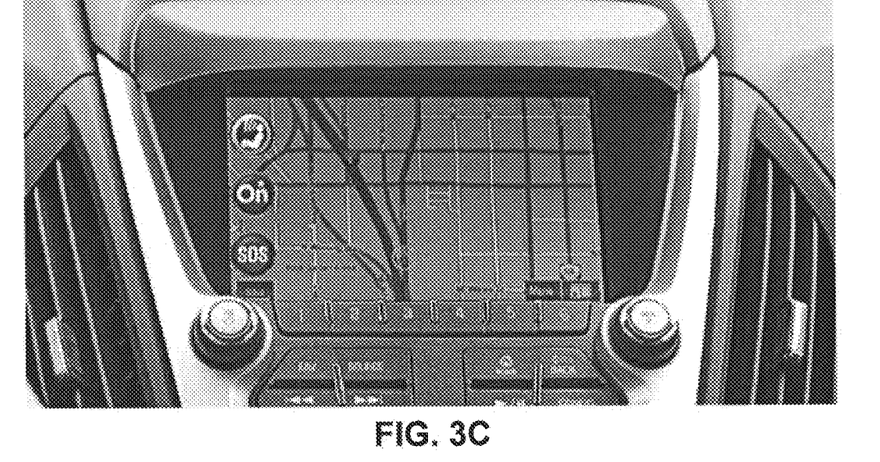
Figure 3D:
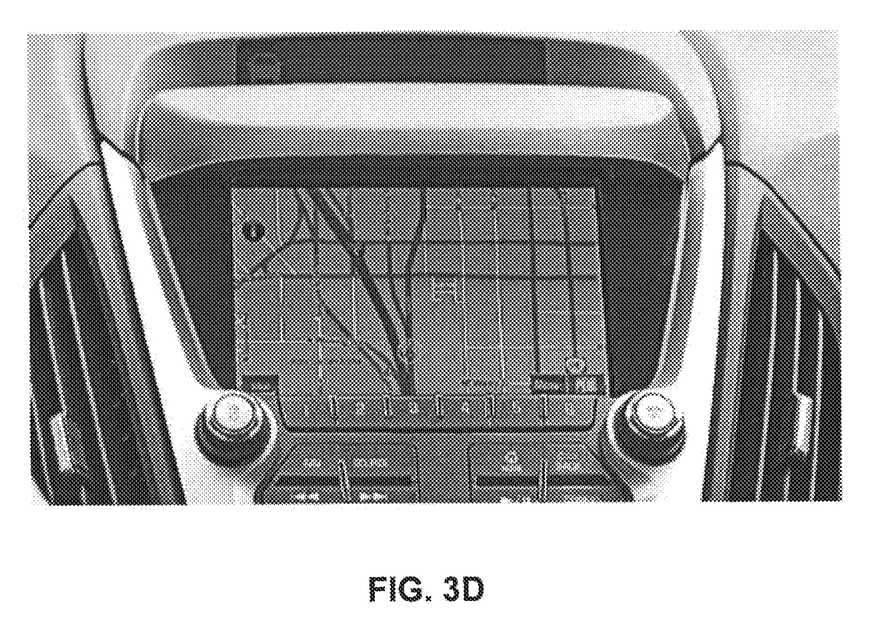

Turning to FIGS. 3C and 3D, in an illustrative example, a child display (e.g., a satellite radio application display) occupies an area of the touchscreen 117 including both the telematics display segment 300 and the infotainment display segment 310 (of FIGS. 3A and 3B). With reference to FIG. 3C, a user touching anywhere on the touchscreen area causes momentary display of the soft buttons 320, 330, and 340 as an overlay on the child display screen. The soft buttons 320, 330, and 340, once displayed, can be "hidden" (see FIG. 3D) by the user touching any part of the touchscreen 117 outside the telematics display segment 300 while the touchscreen is in the display mode depicted in FIG. 3C. The soft buttons 320, 330 and 340 are merely examples of suitable interface controls for presentation of available selections on the screen. Other configurations of the exemplary interface depicted in FIG. 3C having alternative graphical user interface selection controls—including variations in size, shape, image and actuation—are contemplated in alternative implementations. Thus, while particular examples have been described herein, the touchscreen interface in various examples incorporate virtually any kind of display or screen technology capable of operating in a low power state mode (e.g., powering off a portion of the display, dimming the display, etc.) such that the soft buttons 320, 330 and 340 remain active while the display itself is operating in a mode that consumes less energy in an energy conservation mode of operation.

Additionally, the telematics unit 114 may be configured to automatically "hide" the displayed telematics soft buttons 320, 330 and 340, which overlay a child screen display occupying the entire area of the touchscreen 117—as shown in FIG. 3C, when a delay timer expires. The delay timer, for example, expires a time period after the touchscreen initially enters the display mode depicted in FIG. 3C. At which point, the display returns to a full application screen display mode depicted in FIG. 3D.

Conserving electrical energy by the telematics unit, while operating in a backup battery power supply mode, may be performed by selectively deactivating processing hardware and input/output interfaces. The selective deactivation is controlled by software or hardware and/or through function inhibiting logic carried out by programmed power management operations carried out by the telematics unit. To reduce consumption of the backup battery power when the main battery is disconnected, the programmed power management disables features that are not considered essential services/features. Examples of non-essential services/features include: AM/FM radio, CD/DVD reader/player, and a vehicle audio system. Additionally, parts of the display interface of the infotainment system display interface, as mentioned previously, are de-energized. Such selective de-energizing is facilitated by AMOLEDs that support optimizing energy saving by de-energizing non-used portions of the touchscreen display area. Such control can even be performed on a dot by dot basis on the image matrix.

Thus, incorporating the previous service call initiation hardware buttons of the telematics system as touchscreen interface display buttons on the infotainment screen keep the following required features of existing physical buttons incorporated into physically separate consoles: enabling establishing an emergency call via a touch control generally aligned with a typical driver line-of-sight; enabling activating a telematics service without changing the driver's body position while driving and unlocking the safety belts; enabling establishing an emergency call button in the line-of-sight range of the passenger's front seat (passenger's front seats); enabling use the telematics service call buttons by front seat passenger; enabling access to the telematics service call buttons by performing no more than one shift between the displayed screens on the infotainment touchscreen display interface; and providing a user interface equipped with a wide variety of visually displayed indicator(s) of current service/request activation status.

Replacing the known telematics service launch buttons on the mirror with graphical touchscreen call buttons positioned on the infotainment console address several problems including: reducing service launch button interface hardware costs; avoiding additional clutter in the center console of a vehicle that is currently populated with other controls (preventing the hard buttons from being relocated to the center console as additional hard buttons); and providing a place to position the telematics service call buttons in vehicles without an overhead console. Further benefits include: providing a cost saving for a telematics service call platform by avoiding usage of hard buttons and related circuitry/wiring; providing a new customer experience; increasing a level of integration of the functionalities of telematics service launch control and infotainment system controls without compromising on essential functionality during emergency conditions.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operation performed at the call center may be carried out according to stored instructions or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system incorporated within a vehicle, the system being configured to initiate a telematics service call via a touch-based user interface, the system comprising:
    a telematics system configured to support communications relating to telematics services;
    an infotainment center;
    a touchscreen interface configured to present user-selectable controls for invoking services provided by:
        the infotainment center, and
        the telematics system;
    a backup battery configured to supply power, during a disruption of power supply from a primary power supply, to:
        the touchscreen interface,
        the telematics system, and
        a microphone and a speaker providing bi-directional audio communications with providers of telematics services; and
    a backup battery mode control processor configured for:
        sensing a disruption of power provided by the primary power supply, and
        activating, in response to the sensing, a low-power operating mode for the touchscreen interface;
    wherein:
        the touchscreen interface includes one or more user-selectable graphical touch-screen soft buttons by which a vehicle occupant requests telematics services, including an emergency call service, in an event of an emergency;
        the one or more user-selectable graphical touch-screen soft buttons remain active during a disruption in power;
        the processor is configured to provide instructions for the one or more user-selectable graphical touch-screen soft buttons to remain active, while a remainder of the touchscreen interface is deactivated, during the low-power operating mode;
        the processor is configured to, while in the low-power operating mode, power only a portion of a display of the touchscreen interface that produces visible images of the one or more user-selectable graphical touch-screen soft buttons, while not powering the remainder of the touchscreen interface;
        the processor is configured to, while in the low-power operating mode, energize only pixels of a portion of a display of the touchscreen interface that produces visible images of the one or more user-selectable graphical touch-screen soft buttons, while not energizing pixels of the remainder of the touchscreen interface; and
        the touchscreen interface uses a matrix of individually-switched self-illuminating diodes that are controllable to emit light without the use of a master backlight, and wherein the processor is configured to, while in the low-power operating mode, energize only pixels formed by triads associated with the one or more user-selectable graphical touch-screen soft buttons, while leaving the remainder of the touchscreen interface unpowered.

2. The system of claim 1 wherein the system is configured to display, via a home screen display interface for the touchscreen interface, a user-selectable control for invoking the services provided by the telematics system, including the one or more user-selectable graphical touch-screen soft buttons.

3. The system of claim 2 wherein the user-selectable control, including the one or more user-selectable graphical touch-screen soft buttons, occupies a minority portion of the home display screen display interface, and wherein the user-selectable control occupies a position along an edge of the home screen display interface; and wherein a non-overlapping majority portion of the home screen display interface displays infotainment service controls, and non-emergency infotainment services are turned off, while the one or more user-selectable graphical touch-screen soft buttons pertaining to the emergency call service remain on, during the disruption in power.

4. The system of claim 2 wherein the system is configured to display, via an overlay on a child screen display interface for the touchscreen interface, the user-selectable control for invoking the services provided by the telematics system, including the one or more user-selectable graphical touch-screen soft buttons; wherein the system is configured to display the user-selectable control, for invoking the services provided by the telematics system, including the one or more user-selectable graphical touch-screen soft buttons, in response to sensing a touch on the touchscreen interface while displaying the child screen display interface, and wherein the display of the user-selectable control continues until a triggering event occurs.

5. The system of claim 4, wherein the triggering event is expiration of a timed period corresponding to the display of the user-selectable control.

6. The system of claim 4, wherein the triggering event is sending a further touch on the touchscreen interface outside the user-selectable control.

7. The system of claim 4 wherein the touchscreen interface incorporates an active matrix organic light-emitting diode (AMOLED) display technology capable of operating in a low power state mode and in a minority of a full display area of the touchscreen interface to display the user-selectable control for invoking the services provided by the telematics system, including the one or more user-selectable graphical touch-screen soft buttons.

8. The system of claim 4 wherein the touchscreen interface incorporates an LCD display technology capable of operating in a low power state mode where a backlight and a display are active only in a minority of a full display area of the touchscreen interface to display the user-selectable control for invoking the services provided by the telematics system, including the one or more user-selectable graphical touch-screen soft buttons.

9. The system of claim 4 wherein the user-selectable control overlay, including the one or more user-selectable graphical touch-screen soft buttons, occupies a minority portion of the child screen display interface, and wherein the overlay occupies a position along an edge of the child screen display interface.

10. The system of claim 2 wherein the system is configured to display and allow the user-selectable control for invoking the services provided by the telematics system, including the one or more user-selectable graphical touch-screen soft buttons, without the keys and while the vehicle is in OFF power mode.

11. The system of claim 2 wherein the system is configured to display, via an overlay on a child screen display interface for the touchscreen interface, the user-selectable control for invoking the services provided by the telematics system, including the one or more user-selectable graphical touch-screen soft buttons; wherein the system is configured to display the user-selectable control, for invoking the services provided by the telematics system, including the one or more user-selectable graphical touch-screen soft buttons, in response to sensing a touch on the touchscreen interface while displaying the child screen display interface, and wherein the display of the user-selectable control continues until a triggering event occurs, wherein the triggering event comprises a vehicle collision.

12. The system of claim 1 wherein the backup battery is configured to power the telematics system and the touchscreen interface to initiate the telematics service call via the touch-based user interface, specifically, via the one or more user-selectable graphical touch-screen soft buttons, after losing access to power supplied from the primary power supply.

13. The system of claim 1 wherein the touchscreen interface supports selectively powering portions of a display interface for the touchscreen interface, and wherein, while operating in the low-power operating mode, the system selectively powers only a portion of the display interface including the user-selectable telematics control for invoking the services provided by the telematics system, namely, the one or more user-selectable graphical touch-screen soft buttons, thereby reducing power consumption by the touchscreen interface while ensuring continuous access to the user-selectable telematics control.

14. The system of claim 1 wherein, during a disruption of power supply from the primary power supply, the microphone and vehicle audio system is available to the telematics services.

15. The system of claim 1, wherein the one or more user-selectable graphical touch-screen soft buttons comprises three user-selectable graphical touch-screen soft buttons for making a call.

16. The system of claim 15, wherein the three user-selectable graphical touch-screen soft buttons comprise:
a first user-selectable graphical touch-screen soft button for making an emergency call;
a second user-selectable graphical touch-screen soft button for speaking with a call center advisor; and
a third user-selectable graphical touch-screen soft button for initiating a hands-free wireless call.

17. The system of claim 1, wherein the one or more user-selectable graphical touch-screen soft buttons remain active in the event of a vehicle collision.

18. A system incorporated within a vehicle, the system being configured to initiate a telematics service call via a touch-based user interface, the system comprising:
a telematics system configured to support communications relating to telematics services;
an infotainment center;
a touchscreen interface configured to present user-selectable controls for invoking services provided by:
the infotainment center, and
the telematics system;
a backup battery configured to supply power, during a disruption of power supply from a primary power supply, to:
the touchscreen interface,
the telematics system, and
a microphone and a speaker providing bi-directional audio communications with providers of telematics services; and
a backup battery mode control processor configured for:
sensing a disruption of power provided by the primary power supply, and
activating, in response to the sensing, a low-power operating mode for the touchscreen interface;
wherein:
the touchscreen interface includes one or more user-selectable graphical touch-screen soft buttons by which a vehicle occupant requests telematics services, including an emergency call service, in an event of an emergency;
the one or more user-selectable graphical touch-screen soft buttons remain active during a disruption in power;
the processor is configured to provide instructions for the one or more user-selectable graphical touch-screen soft buttons to remain active, while a remainder of the touchscreen interface is deactivated, during the low-power operating mode;
the system is configured to display, via a home screen display interface for the touchscreen interface, a user-selectable control for invoking the services provided by the telematics system, including the one or more user-selectable graphical touch-screen soft buttons; and
the user-selectable control, including the one or more user-selectable graphical touch-screen soft buttons, occupies a minority portion of the home display screen display interface, and wherein the user-selectable control occupies a position along an edge of the home screen display interface; and wherein a non-overlapping majority portion of the home screen display interface displays infotainment service controls, and non-emergency infotainment services are turned off, while the one or more user-selectable graphical touch-screen soft buttons pertaining to the emergency call service remain on, during the disruption in power.

* * * * *